United States Patent
Howells et al.

(10) Patent No.: US 6,291,041 B1
(45) Date of Patent: Sep. 18, 2001

(54) HEAT RESISTANT NYLON MULTI-LAYER FILM

(75) Inventors: Scott Howells, Oshkosh; Gregory Robert Pockat, Ripon, both of WI (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 09/309,077

(22) Filed: May 10, 1999

(51) Int. Cl.$^7$ .............................. B23D 22/00; B32B 1/08
(52) U.S. Cl. ................... 428/35.4; 428/36.7; 428/474.7; 428/474.9; 428/475.5; 428/475.8; 428/476.3; 428/476.9; 428/476.1; 264/173.15; 264/173.16; 264/173.19; 264/176.1
(58) Field of Search .............................. 428/474.9, 475.5, 428/475.8, 476.3, 476.9, 35.4, 36.7, 474.7, 476.1; 264/176.1, 173.15, 173.16, 173.13

(56) References Cited

U.S. PATENT DOCUMENTS

| | | |
|---|---|---|
| 4,735,855 * | 4/1988 | Wofford ................................ 428/349 |
| 4,767,651 | 8/1988 | Starczewski et al. ............... 428/35.2 |
| 4,999,229 | 3/1991 | Moritani et al. ..................... 428/36.6 |
| 5,382,470 | 1/1995 | Vicik .................................... 428/334 |
| 5,393,592 | 2/1995 | Jenne ................................... 428/213 |
| 5,491,009 | 2/1996 | Bekele ................................. 428/35.7 |
| 5,707,750 * | 1/1998 | Degrassi ............................. 428/474.9 |
| 5,716,715 | 2/1998 | Degrassi et al. ................... 428/475.8 |

* cited by examiner

Primary Examiner—Leszek Kiliman
(74) Attorney, Agent, or Firm—Lee, Mann, Smith, McWilliams, Sweeney & Ohlson

(57) ABSTRACT

A multi-layer heat resistant film laminate with good optical properties, extended shelflife, and memory characteristics and its method of manufacture, the laminate having the generalized structure of (outside) A/B/C/D/C/B/E (inside), where A is an outer moisture barrier layer, B is an intermediate adhesive layer, C is a polyamide layer D is an oxygen barrier layer, and E is a sealant layer.

10 Claims, 1 Drawing Sheet

HEAT RESISTANT NYLON MULTI-LAYER FILM

BACKGROUND OF THE INVENTION

The invention relates generally to thermoplastic packaging, and more specifically to heat resistant nylon multi-layer packaging film for food products.

It is common practice to package articles such as food products in thermoplastic films or laminates to protect the product to be packaged from abuse (i.e., oxygen or moisture) or exterior contamination, and to provide a convenient and durable package for transportation and ultimate sale to the end user.

The equipment used to package said food products typically use two multi-layer films to protect the product. One film is heated and formed into a die cavity where the product is loaded into the cavity. The second film is generally mechanically fed through the machine and allowed to drape or hang over the filled cavity and a heated metal platen pushes the second film (also known as the non-forming film) over the product and into the remaining space left in the cavity and the two films are sealed together with temperature, pressure and time.

Two major types of nylon used in multi-layer packaging film of this type are Nylon 6 and Nylon 6/6,6. It is well known in the prior art to use one type or the other in multi-layer films. Nylon 6/6,6 is a copolymer nylon that has a lower melting point (196° C.) than Nylon 6, flows easily when heated and bonds to other polymers well for a polyamide. Its flow properties make it an excellent structural nylon for forming films that are used to form into the die cavities of packaging equipment. However, when film made with Nylon 6/6,6 is used as a non-forming film, a temperature related problem occurs. The problem manifests itself when the Nylon 6/6,6 non-forming film is exposed to the high temperatures required to produce hermetically sealed packages. Coextruded, multilayer films made with Nylon 6/6,6 will stick to the seal platen or in the worst case, physically melt and create holes in the film when exposed to the temperatures necessary to create acceptable packages.

Nylon 6 has a higher melting point (220° C.) than Nylon 6/6,6 and as a result has more resistance to sticking or melting than Nylon 6/6,6 and is the preferred resin for most non-forming applications. However, it is known that using Nylon 6, in very demanding applications, such as sealing through product contamination or making packages at very high line speeds, can lead to the same sticking and melting issues observed with multi-layer films made with Nylon 6/6,6.

Often in food packaging applications a "fatty" residue is left on the packaging film when positioning a food product to be packaged. Knowledge of the heat seal process is vital to understanding the importance of heat resistance in a packaging film. The heat seal process is as follows:

1) The heat seal layers contact each other in the packaging operation when heat and pressure are applied;
2) The sealant materials melt with time and temperature;
3) The opposing heat seal layers are transformed into a "wetted" interface with time and pressure;
4) Once the polymer molecules are "wetted," they begin to diffuse and entangle across the interface, forming an "interphase," a region of melted entangled polymer chains; and
5) Heat is removed and the polymer at the "interphase" begins to build viscosity as it cools, eventually crystallizing into a solid heat seal.

The above "fatty" residue interferes with the wetting of the polymer seal layers and subsequent polymer diffusion that occurs during the heat seal process. The more heat one can apply to the packaging film, the lower the viscosity of the melted polymer which allows more diffusion and entanglement of the polymer molecules at the "wetted" interface. The more entanglement and diffusion that occurs, the greater the chance the sealant layers will not be affected by the contamination residue.

A material such as Nylon 6,6, which has an even higher melting point (255° C.) than that of Nylon 6 and thus could potentially be used in high temperature heat seal applications, would be desirable.

However, it is well known that using Nylon 6,6 in a multi-layer structure creates temperature induced problems for the layers near such nylon (i.e., a layer of oxygen barrier material) and causes the surrounding layers to overheat.

As a result of more and more applications requiring high temperature heat seals, a need has arisen for a multi-layer film that includes the heat resistance of Nylon 6,6 without its detrimental effects on the adjacent layers of the structure. The disclosed invention teaches a heat resistant nylon multi-layer film that includes a layer of each of these nylons, and its method of manufacture.

SUMMARY OF THE INVENTION

A seven-layer blown coextruded film is disclosed with excellent heat resistance that can be used as a forming or non-forming film. The film contains an outer layer or either nylon 6,6 of a blend of nylon 6,6 and nylon 6. This layer is the heat resistant layer and can be from 5 to 40% of the total thickness of the structure. The next layer is an adhesive layer. The next three layers, in order, consist of nylon 6, EVOH and nylon 6. Nylon 6 serves as an excellent tie layer or adhesive to the EVOH and this Nylon/EVOH/Nylon combination also allows the film to be formed without any aesthetic difficulties. The sixth layer of the film is another adhesive layer and the seventh layer is a sealant layer containing an ionomer such as Surlyn® manufactured by Dupont, or a polyolefin type material. The sealant layer can be 5 to 50% of the total thickness of the structure.

The manufacturing process of the disclosed heat resistant nylon multi-layer film consists of keeping a single layer of Nylon 6,6 or a blend of Nylon 6,6 and Nylon 6 to the inside of an annular multi-layer blown film die. The inner area of the die has specific heaters designed to deliver a concentrated application of heat to the inside part of the die and effectively thermally isolates the Nylon 6,6 from the outer layers of the structure.

This step is necessary because the melting point of Nylon 6,6 is approximately 35° C. higher than the melting point of nylon 6, and this higher temperature reduces the viscosity of the other layers in the structure. A reduction of viscosity of the other layers decreases the processability of the other coextruded materials, and puts them at risk of thermal degradation. This is especially true for oxygen barrier materials, such as EVOH, which are extremely sensitive to high temperatures during extrusion. By isolating the Nylon 6,6 during this process, the processability of the materials is significantly increased, making for a viable product. Thus, the disclosed process produces a multi-layered film with an outside layer which includes Nylon 6,6 for increased heat resistance.

DETAILED DESCRIPTION OF THE PREFERRED EMBODIMENTS

Figure 1:
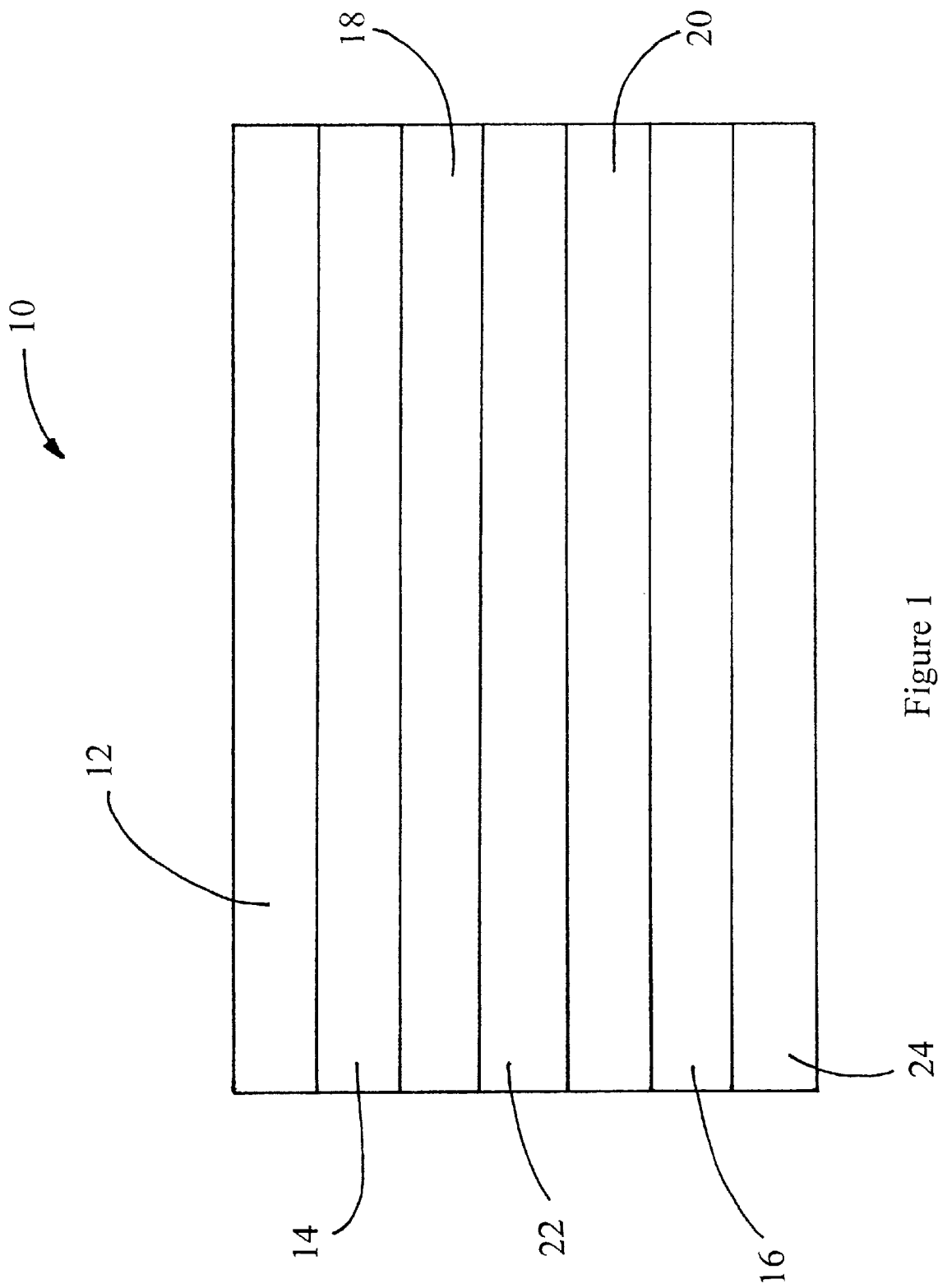
FIG. 1 is a schematic cross-section of a preferred embodiment of a multi-layer heat resistant film laminate of the invention.

The present invention is directed to a seven-layer coextruded film that incorporates simultaneous use of both Nylon 6 and Nylon 6,6 in separate layers to increase the heat resistance of the multi-layer film structure. Referring specifically to FIG. 1, the multi-layer film structure, generally designated at reference numeral 10, is directed to a multi-layer composite where outer layer 12 is a heat resistant layer, layers 14 and 16 are intermediate adhesive layers, layers 18 and 20 are polyamide layers, layer 22 is an oxygen barrier core layer, and layer 24 is a sealant layer. The multi-layer film 10 is designed to be used in the packaging of food products and can be used as both forming and non-forming film.

Preferably, outer layer 12 is comprised of either Nylon 6,6 or a blend of Nylon 6,6 and Nylon 6. An ideal blend ratio would be 60% Nylon 6,6 and 40% Nylon 6. Layer 12 is the heat resistant layer and can be from 5 to 40% of the thickness of the total structure, preferably about 15% of the thickness of the total structure.

Oxygen barrier core layer 22 is preferably an ethylene vinyl alcohol copolymer (EVOH). The preferred thickness of this layer is 0.3 mils. One such EVOH that has been found to be acceptable can be purchased from Nippon Gohsei under the trade name Soarnol® ET. This material exhibits excellent oxygen barrier properties at low humidity with lesser barrier qualities at higher humidity, but in combination with layers 18 and 20 extends the shelf life of a food product contained in the laminate of the invention.

On either side of the barrier layer 22 are polyamide layers 18 and 20 comprising Nylon 6, which bond easily with the EVOH material of barrier layer 22. Preferably, layers 18 and 20 include nucleated nylon 6 purchased from BASF under the trade name B36.

Sealant layer 24 is preferably an ionomer such as Surlyn®, available from DuPont Company. This material is essentially a metal saltneutralized copolymer of ethylene and acrylic or methacrylic acid. Other suitable sealant materials include matallocene catalyzed polyolefins, polyolefins, ethylene-alpha olefin copolymers, and blends thereof. Sealant layer 24 can be 5 to 50% of the thickness of the total structure 10 with the preferred thickness being 20% of the total thickness.

Tie layers 14 and 16, respectively, assure adhesion between polyamide layer 18 and outer layer 12 and between polyamide layer 20 and sealant layer 24. These tie layers 14 and 16 may be identical or different from each other, and may include a wide range of anhydride/grafted polyolefins including those based on ethylene vinyl acetate copolymer, polypropylene, low density polypropylene, linear low density polypropylene, and very low density polyethylene. Preferably, the compositions of adhesive layers 14 and 16 are based on linear low density polyethylene. One such layer which has been used satisfactorily is Tymor 1203, which can be purchased from Morton.

The multi-layer film structure 10 of the present invention provides good optical properties including clarity and high gloss, improved heat resistance, excellent forming, extended shelflife, and improved shrink memory characteristics.

Multi-layer films in accordance with the present invention may be made by coextruding the various resins through seven extruders simultaneously. The extrudate is passed through an annular die where the layers are joined to form a total coextrusion. Based on the knowledge of typical extrusion temperatures of Nylon 6 at about 220° C. and Nylon 6,6 at about 255° C., it would not be expected that these materials could be coextruded in a tubular coextrusion process. It would be expected that the Nylon 6 might be degraded at this much higher temperature and that, in any event, it would have such a high melt flow rate that the tube could not be supported. Surprisingly, no degradation is experienced, and the extruded tube is readily maintained in the blown extrusion process.

Thus the preferred process is a tubular quench coextrusion. Quenching of the extrudate is desired to preserve the amorphous nature of the molecular arrangements in the layers.

Typical processing temperatures are 223° C. at the outlet of the extruders processing nylon 6 for layers 18 and 20. Comparable temperature at the outlet of the extruder processing the nylon 6,6 of layer 12 is 255° C. The seven layers exit their respective extruders and are joined at an annular die. Due to the melting point gradient between polyamide layers 18 and 20 and outer layer 12 (a difference of approximately 35° C.), only a single layer of Nylon 6,6 is used in the film structure 10. By using a single layer of Nylon 6,6 in the film structure, one can run the nylon 6,6 on the inside of the die and can somewhat isolate this material by running only the inside of the die at the temperatures needed to process the Nylon 6,6 and leave the remainder of the die at "normal" conditions for the rest of the structure. The temperature gradient across the die is about 143°, with the temperature along the inside of the die at about 293° C. and the temperature along the outside of the die at about 150° C.

This isolation process significantly increases the processability of the materials and makes for a viable product. Running the Nylon 6,6 on the outside of the bubble does not work due to the effects of convection and conduction occurring around the die to the ambient air.

After the tube is quenched, the multi-layer film 10 is carried through a series of rollers and collapsed into a flat sheet. Films of this invention may be made into packages by sealing together facing portions of two separate sheets of the material, or by folding over a portion of the sheet material and heat sealing it to itself about a contiguous periphery in order to form a container. After the container is formed, the package may have product inserted therein through the open end. The container may then be evacuated and sealed, or air may be left in the container for cushioning purposes, or for other purposes.

Various features of the invention have been particularly shown and described in connection with the illustrated embodiments of the invention. However, it must be understood that these particular arrangements do not limit, but merely illustrate, and that the invention is to be given its fullest interpretation within the terms of the appended claims.

What is claimed is:

1. A multiple layer film including:
    a first polyamide layer having melting point temperatures greater than approximately 220° C., said first layer including nylon 6,6;
    a second adhesive layer;
    a third polyamide layer;
    a fourth core layer comprising an oxygen barrier material;
    a fifth polyamide layer;
    a sixth adhesive layer; and
    a seventh sealant layer.

2. A multiple layer film in accordance with claim 1 wherein said first layer is a blend of nylon 6 and nylon 6,6.

3. A multiple layer film in accordance with claim 1 wherein said fourth core layer oxygen barrier material includes ethylene vinyl alcohol copolymer.

4. A multiple layer film in accordance with claim 1 wherein said seventh sealant layer is a heat-sealable material taken from the group consisting of ionomers and polyolefins.

5. A multiple layer film in accordance with claim 1 wherein said first layer represents a thickness of between about 5 to about 40 percent of the overall thickness of said film.

6. A multiple layer film in accordance with claim 1 wherein said seventh sealant layer represents a thickness of between about 5 to about 50 percent of the overall thickness of said film.

7. A multiple layer film in accordance with claim 1 wherein said third polyamide layer includes a nucleating agent.

8. A multiple layer film in accordance with claim 1 wherein said fifth polyamide layer includes a nucleating agent.

9. A method for producing a multiple layer film including the steps of:

providing a multiple layer co-extrusion die;

providing multiple film resins to be co-extruded within said die, one of said film resins being a polyamide having a melting point temperature greater than 220° C., said polyamide including nylon 6,6;

co-extruding said multiple film resins through said die, such that said polyamide is placed within the innermost portion of said die, thereby combining said multiple film resins to form a multiple layer film;

filling said die with air thereby causing said multiple layer film to expand into the shape of a tube;

cooling said tube of multiple layer film; and carrying said tube of multiple layer film through a series of rollers thereby causing said tube of multiple layer film to collapse and form a flat sheet.

10. A method for producing a multiple layer film in accordance with claim 9 further including the steps of:

setting the temperature across the inside of said die at about 293° C.; and setting the temperature across the outside of said die at about 150° C.

\* \* \* \* \*